United States Patent [19]
Shinoi et al.

[11] 3,904,834
[45] Sept. 9, 1975

[54] HANDSFREE LOUDSPEAKING KEY TELEPHONE SET AND A SWITCHING CIRCUIT FOR USE IN A MICROPHONE AND LOUDSPEAKER EQUIPPED KEY TELEPHONE

[75] Inventors: Tsuyoshi Shinoi; Toyoshige Murakami, both of Kawasaki, Japan

[73] Assignees: Nippon Tsu Shin Kogyo K.K., Japan; TIE/Communications, Inc., Stamford, Conn.

[22] Filed: Mar. 23, 1973

[21] Appl. No.: 344,212

[30] Foreign Application Priority Data

Feb. 10, 1973 Japan ............................... 48-16137

[52] U.S. Cl. ................ 179/99; 179/1 HF; 179/81 B
[51] Int. Cl.[2] .......................................... H04M 1/60
[58] Field of Search .................. 179/99, 1 HF, 81 B

[56] References Cited

UNITED STATES PATENTS

| | | | |
|---|---|---|---|
| 2,975,237 | 3/1971 | Abbott | 179/99 |
| 3,725,601 | 4/1973 | Jetzt et al. | 179/99 |
| 3,743,791 | 7/1973 | Duff et al. | 179/81 B |
| 3,743,792 | 7/1973 | Duff et al. | 179/84 C |
| 3,787,640 | 1/1974 | Bush et al. | 179/99 |

*Primary Examiner*—Thomas W. Brown

[57] ABSTRACT

A key telephone system is disclosed comprising microphone and loudspeaker equipped key telephone sets in which intercom calls are received through the microphone and loudspeaker. Additionally, the microphone and speakers may be used for central office calls. When so used, brief intercom calls can be allowed to break in, automatically placing the central office call on hold.

6 Claims, 2 Drawing Figures

HANDSFREE LOUDSPEAKING KEY TELEPHONE SET AND A SWITCHING CIRCUIT FOR USE IN A MICROPHONE AND LOUDSPEAKER EQUIPPED KEY TELEPHONE

BACKGROUND OF THE INVENTION

The present invention relates, in general, to a switching circuit and more particularly to a switching circuit for use in a key telephone equipped with a microphone and a loudspeaker.

In a key telephone system, at the time a call on a central office line or a PBX line (hereafter called a central office or outside line) is held and it is desired to transfer the call to another key telephone user, various methods are used. For example, one person may directly communicate by voice with another if he is in the vicinity, or call him by means of a separate intercommunication line (hereafter called intercom line) installed in the key telephone system and thereby commmunicate with the person if he is in a distant location. Another alternative is to communicate directly by a voice paging device. In using an intercom line, which is the most common method, the original party must first place the outside line on hold, push the key of the intercom line, call the particular location desired by dialing the intercom number of the party, wait for the called party to answer, and then inform the party of the details of the outside call on hold. Using this procedure, unless the second person pushes the intercom line pickup key and picks up the handset to establish communication, he will not know the held outside line call is for him. However, in a key telephone set having a built in voice paging speaker as an intercom call signalling device, the first party can effect transfer of the call by an announcement of the details through the speaker. Using this method, even if the second person does not answer, if he is within hearing range of the speaker, he will known which circuit on hold he must answer without being required to first answer the intercom line to obtain the details. The first user, however, will not know with any degree of certainty whether he has reached the second party with his announcement.

A feature of the present invention, therefore, is to overcome this limitation, by furnishing a microphone in addition to the loudspeaker in each key telephone set, so that the called party may, without pushing the pickup key for an intercom line and without using the handset, converse with the caller through the microphone and the speaker. Thus the second person can be made aware of the purpose of the intercom call and can reply without performing any mechanical step whatever, while the first party can be certain of the second party's presence at the second location.

A further feature of the present invention is the ability to establish communication through an outside line by use of the microphone and speaker without being required to use the handset.

Another feature of the present invention is that in the event an intercom call is received while the person speaking on an outside line is using the microphone and speaker, the outside call can be held while a conversation is carried on with the intercom caller by using the microphone and speaker. This is accomplished by activating a special key furnished in the telephone set.

In summary, in the present invention means are provided in a key telephone system for connecting each key telephone to any other key telephone through a loudspeaker and microphone in the called key telephone. Further, means are provided to connect the key telephone's microphone and speaker to a central office line call, and for connecting an intercom call to the microphone and speaker of a key telephone when the microphone and speaker are being used on a central office call, holding the central office call, speaking to the intercom caller for a brief period, releasing the intercom call, and then resuming the conversation on the central office line.

BRIEF DESCRIPTION OF THE DRAWINGS

The invention, as well as its objects and features, will be better understood by reference to the following detailed description of the preferred embodiment taken in conjunction with the accompanying drawings in which.

DESCRIPTION OF THE PREFERRED EMBODIMENT

Figure 1:
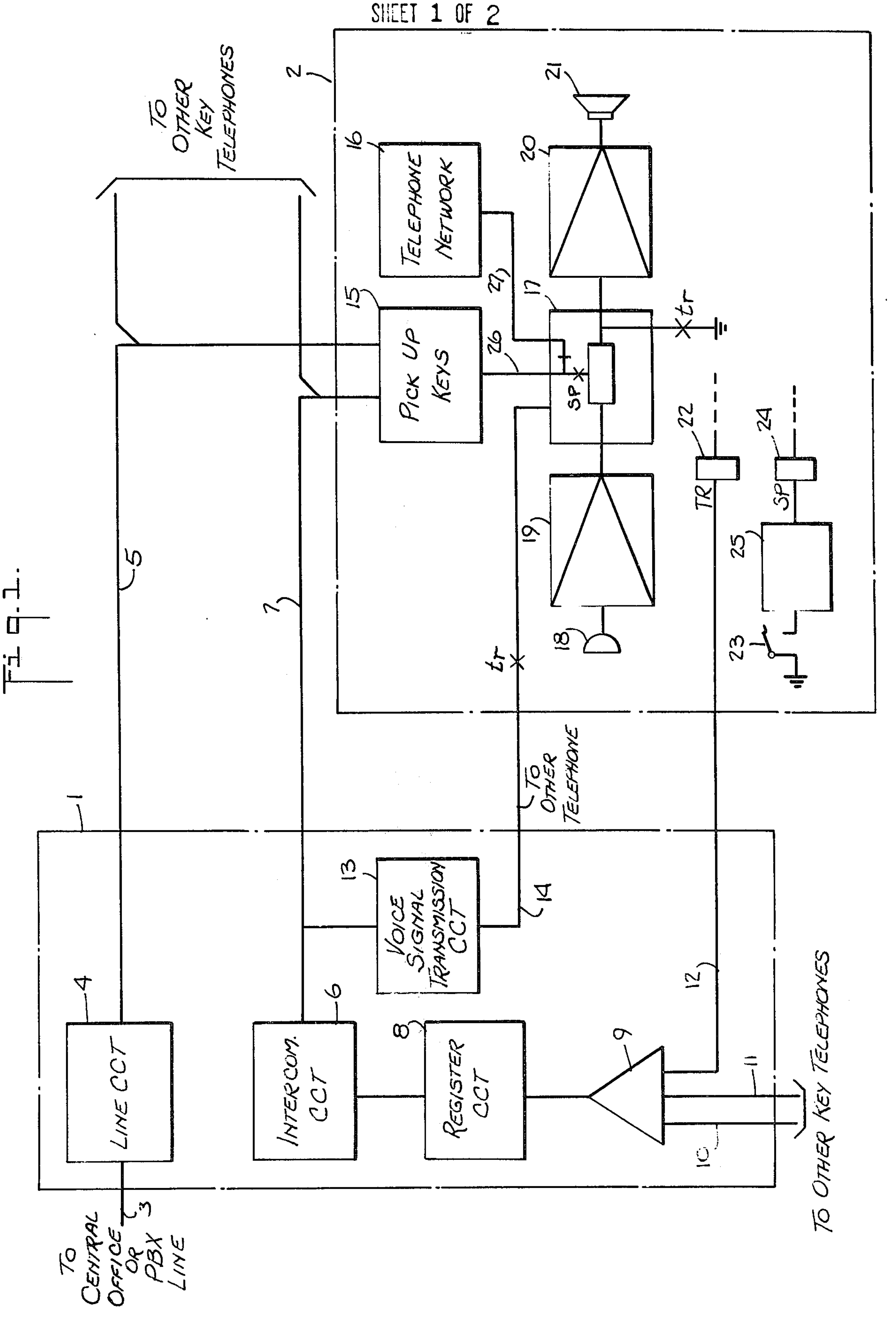
FIG. 1 is a block diagram of a key telephone system using the preferred embodiment of this invention.

As shown in FIG. 1, a key service unit 1 is interconnected to one of a plurality of key telephone sets 2 having both a microphone 18 and speaker 21. The central office or a PBX line is connected to the key service unit 1 by line 3 through a line circuit 4. A pair of line conductors 5 identical to 3 are extended between each key telephone set 2 and the key service unit 1. An intercom line circuit 6 including a battery feed relay is connected by a pair of line conductors 7 to the intercom line key contacts of each key telephone set 2. A register circuit 8, connected to intercom circuit 6, counts the dial pulses and responds to other signals from intercom circuit 6. Output tree circuit 9 receives the output of the register 8 and selects the desired one of the register outputs 10 through 12 corresponding to the dialed key telephone set. In order to couple the speaker and microphone to the intercom line and hence to the calling party, a voice signal transmission circuit 13 is connected between the intercom line 7, and switching circuit 17, by voice signal path 14. Pickup keys contacts 15 are used to select a suitable line and thereby connect telephone network 16 through switch circuit 17. The function of switching circuit 17 is to switch the microphone 18 and speaker 21 between the voice path 14 and an outside line 5 or intercom line 7. Microphone 18 and speaker 21 both have their own amplifiers 19 and 20, respectively. TR relay 22 is operated via path 12 when an intercom call is received. A locking key contact 23, connected through flip flop circuit 25, controls SP relay 24 which connects the microphone 18 and speaker 21 to the pickup keys. Its make-break contact is shown, in FIG. 2, within switching circuit 17. The flip flop circuit 25 operates SP relay 24 when key 23 is pushed and releases SP relay 24 when key 23 is released. A pair of conductors 26 and 27 connect a telephone network 16 to the pickup key 15 when relay 24 is released; when relay SP 24 operates line 26 is disconnected from 27 and connected to the microphone amplifier 18 and speaker amplifier 19.

The operation of this invention for an intercom call will be explained through FIG. 1. When an intercom call is made, telephone network 16 of the calling party is connected through the pair of conductors 27 to the switching circuit 17, through pair 26 to the pickup keys 15, and via line conductor 7 to intercom circuit 6. When the party finishes dialing, the output from register circuit 8 is connected through output tree circuit 9 and appears at the appropriate line 10, 11 or 12, driving relay TR of the telephone set called. TR relay 22 operates, energizing the microphone and speaker circuits via switch circuit 17 and simultaneously connecting them to conductor 14. By this connection the caller and the person called can converse through voice signal transmission circuit 13.

In the event the person called is using the handset, the pickup key for the appropriate intercom line could be pushed, telephone network 16 would be connected to conductor 7 and talking could be carried on between the two parties. This feature is the subject of another patent application Ser. No. 348,286, now U.S. Pat. No. 3,881,069, entitled "A Telephone Call Loudspeaker Monitoring And Relay Control Circuit" by M. Ichikawa, K. Gotah and S. E. Kerman, filed on Apr. 5, 1973.

If a party wishes to talk on an outside (or intercom) line, using the microphone and speaker, key 23 is pushed, SP relay 24 operates, the pickup key of the outside (or inside) line is then pushed, the microphone and speaker circuit are thereby connected to conductor 5 (or 7) through pickup key contact 15, (or 14) conductor 26 and switch circuit 17. The user can then talk on the outside (or inside) line without using the handset.

Figure 2:
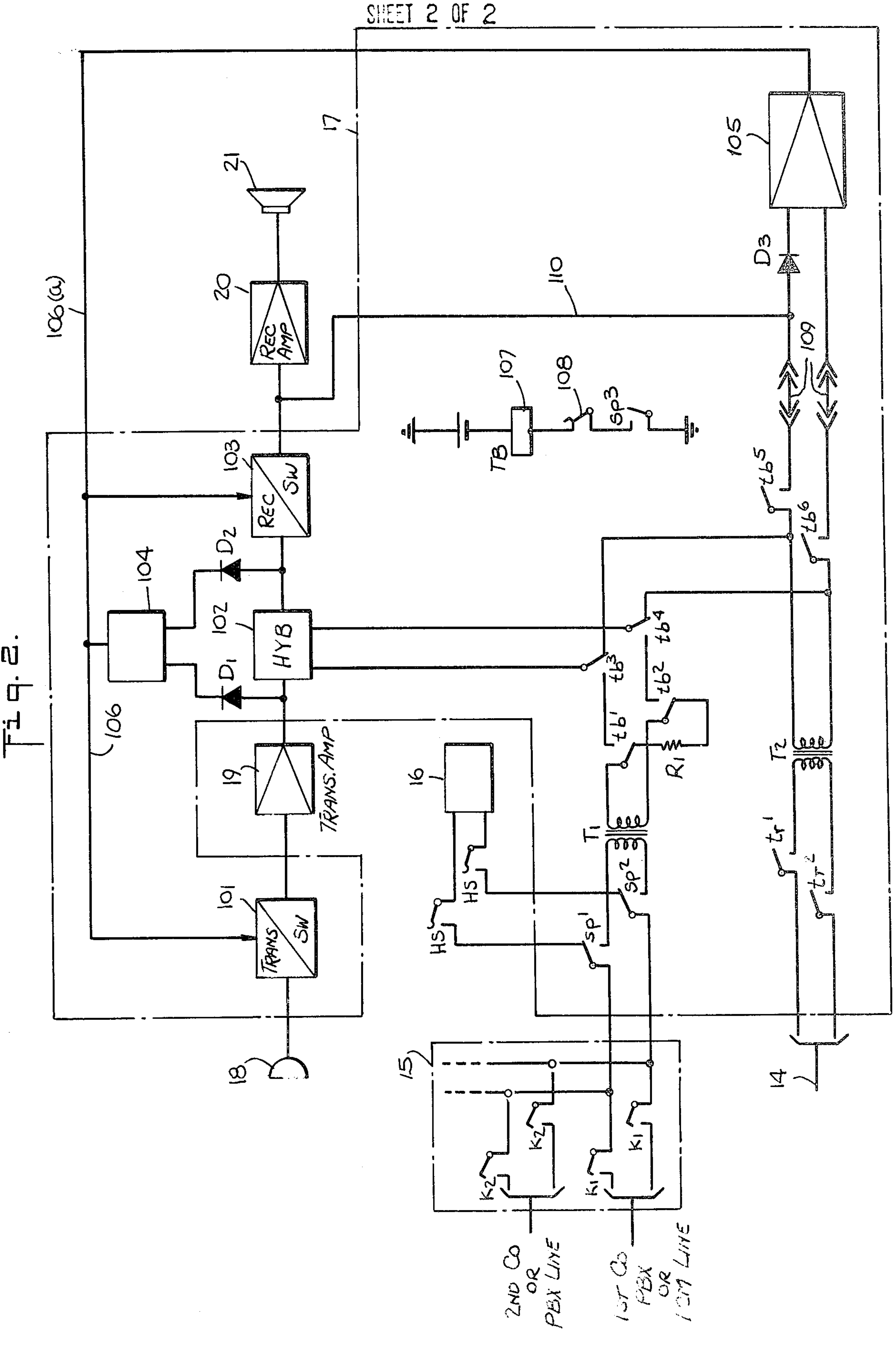
FIG. 2 is a block diagram of a microphone equipped key telephone set showing in greater detail the components used in the preferred embodiment of this invention.

In FIG. 2 the major components are labelled with either letter or numeral designation, K1 and K2 are pickup keys, HS is a switch hook, sp, tr and tb are contacts for relays SP, TR, and TB, respectively and 101 is a voice switch circuit that controls the input of microphone amplifier 19. This voice switch circuit is the subject of another patent application Ser. No. 344,218, now U.S. Pat. No. 3,860,756, entitled "Automatic Voice-Path Switching Circuit For A Speaker Phone Telephone Set" by T. Shinoi and T. Murakami filed on Mar. 23, 1973. This switch is ordinarily in a partially conductive state. Coil 102 is a hybrid coil used to prevent electrical coupling from the microphone 18 to the speaker 21. A voice switch circuit 103 is used to control the input to speaker amplifier 20. A comparator 104 is used to compare the signal at the output from the microphone amplifier 19, rectified by diode D1, with the signal at the output from the hybrid coil 102, rectified by diode D2. When the signal from the microphone amplifier 19 is greater than the signal from the hybrid coil 102 then voice switch 103 becomes nonconductive and voice switch 101 simultaneously passes from partial conductivity to complete conductivity. Conversely, when the signal from the hybrid coil 102 is greater than the signal from the microphone amplifier 19, voice switch 101 becomes nonconductive while voice switch 103 simultaneously becomes conductive. This occurs because the output of voice switch 103 is connected through line 110 and diode D3 to amplifier 105. The output of amplifier 105 is connected through line 106*a* to the output of comparator 104, forcing voice switch 101 into the nonconductive condition when a signal, rectified by diode D3, appears at its input through lines 106 and 106*a*. Simultaneously it makes voice switch 103 conductive. TB relay 107 is operated by the operation of the SP relay contact SP3. Switch 108 is intended to release the TB relay 107 when the contact is opened through the nonlock type key 108.

To explain the operation of this circuit, if telephone set 2 receives an intercom call, TR relay 22 (FIG. 1) operates, and the voice signal is connected (FIG. 2) to hybrid coil 102 from line 14 by contacts *tr*1 and *tr*2, transformer T2 and contacts *tb*3 and *tb*4. The signal from the hybrid coil 102 is rectified by diode D2 and is applied as an input to comparator 104. The output of comparator 104 appears at 106. Because voice switch 103 is driven into conduction, the output of the hybrid coil 102 is connected to amplifier 20, with the voice signal of the caller coming out of the speaker 21. Meanwhile, the output at 106 switches voice switch 101 (which heretofore had been partially conducting) to a state of nonconductivity, thereby preventing feedback through the speaker and microphone. When the voice signal of the caller stops, no output appears at 106, voice switch 101 returns to normal, i.e., partial conduction, and voice switch 103 becomes nonconductive. At this point if the person receiving the call speaks into the microphone, his voice, amplified by amplifier 19, passes through hybrid coil 102, contacts *tb*3 and *tb*4 and transformer T2 and is applied to line 14. The output from amplifier 19 is also rectified by diode D1 and applied as an input to comparator 104. The output of comparator 104 switches voice switch 101 to a completely conductive state and voice switch 103 is held in the non-conductive state. Because of the operation of voice switch 103 no sound is heard from the speaker 21, and consequently no feedback or howling occurs.

In the event the party wants to talk with the central office (CO) or the switchboard (PBX) line by means of the microphone and speaker, he operates the appropriate pickup key, for example, K1, and depresses key 23 (FIG. 1) operating SP relay 24 and TB relay 107 and connecting conductor 5 to the hybrid coil 102 through contacts K1, sp1 and sp2, transformer T1, contacts *tb*1, *tb*2, *tb*3 and *tb*4 (FIG. 2). The talking thereafter is the same as in the case of an intercom call described above.

Wiring option 109 can be connected as shown by the arrows, in FIG. 2 and if an intercom call is received while the telephone set is being used on an outside line, relay TR operates and the signal input from line 14 passes through contacts *tr*1, *tr*2, transformer T2 and contacts *tb*5 and *tb*6. The signal is fed to receiving amplifier 20 and speaker 21 via line 110 and also rectified by diode D3 and applied to amplifier 105. The output from amplifier 105 forces voice switch 101 into a completely nonconductive state, while voice switch 103 is made conductive. The telephone set is thus placed in a receiving condition so that the outside party cannot accidentally overhear the intercom caller's voice and the voices from both the outside line and the intercom line are heard from the speaker 21. Thereby the user knows that an intercom call is being received while privacy is also guaranteed. If the user desires to talk with the intercom caller momentarily, switch 108 is opened, TB relay 107 releases, and the external line remains connected to transformer T1. Because the secondary winding of T1 is bridged by resistance R1 at break contacts *tb*1 and *tb*2, the outside line during this interval is held and terminated by the proper impedance. On the other hand the input signal from 14, after passing through transformer T2 passes through contacts *tb*3 and *tb*4 and enters the hybrid coil 102, and the user can talk to the intercom caller only. When the user finishes his conversation and releases switch 108, relay TB again operates, the hybrid coil 102 is reconnected to transformer T1, and the user can again speak on the outside line.

Thus the circuit of the present invention is one that simplifies the key manipulations of prior complicated key telephone sets and is of greater convenience because the microphone and speaker are furnished in the key telephone set, enabling the unit to be used as a speaker phone for outside and intercom calls without performing any additional operation. Intercom calls are automatically connected without any operation by the called party. Further, in the event an intercom call is received while a conversation is taking place on an outside line, using this invention, the user is capable of talking with either caller privately and alternating easily between the two by simply operating and releasing a single non-locking switch.

It is to be understood that the embodiment of this invention described herein is merely intended to illustrate the operative principles of the invention and is not to be considered as limiting the scope of the invention. Modifications may be made by those skilled in the art without departing from the spirit of the invention.

What is claimed is:

1. A key telephone system comprising a plurality of key telephones having a telephone network circuit means;

an intercom line circuit means connecting the key telephones;

at least one central office line circuit means having a central office signalling means;

switching means, connected between the central office line circuit means and the key telephone network circuit means, responsive to the central office signalling means for connecting the central office line circuit means to the key telephone network circuit means;

a loudspeaker and microphone circuit means within each key telephone;

intercom signalling means within each key telephone connected to the intercom line circuit means, for selecting and signalling another key telephone; and switching means, connected between the intercom line circuit means and the loudspeaker and microphone means of each key telephone, responsive to the intercom signalling means for connecting the microphone and loudspeaker means to the intercom line circuit means independent of the central office line circuit means and the key telephone network circuit means when one key telephone is signalled on the intercom line circuit means by another key telephone, whereby one key telephone can communicate with another key telephone through the loudspeaker and microphone circuit means at the same time a central office line call is in progress from the called key telephone.

2. A key telephone system as in claim 1 wherein the plurality of key telephones are adapted to be selectively connected to either an intercom line circuit means or a central office line circuit means by means of selecting one of a plurality of pickup key means mounted on each key telephone;

and further comprising:

a second switching means connected to each of the pickup key means within each key telephone for selectively connecting the loudspeaker and microphone circuit means of each key telephone to the line circuit means selected by said pickup key means.

3. A key telephone system as in claim 1 wherein the intercom signalling means further comprises a key service unit for selectively signalling a key telephone and the intercom switching means comprises a relay responsive to a signal from the key service unit to connect the loudspeaker and microphone circuit means to the intercom line circuit means.

4. A key telephone system as in claim 2 wherein the second switching means is comprised of a key means, connected to and controlling the operation of a relay connected to a plurality of line pickup keys, the operation of said keys operating said relay and selectively connecting the line circuit means to the loudspeaker and microphone circuit means, thereby permitting the selective connection between either the intercom line circuit means or the central office line circuit means and the loudspeaker and microphone circuit means.

5. A key telephone system as in claim 4 further comprising hold switching means, for use when the loudspeaker and microphone circuit means are connected to a central office line circuit means, for switching the central office line circuit means to a hold condition and connecting the loudspeaker and microphone means to an intercom line circuit means.

6. A key telephone system as in claim 5 further comprising a hold-release switching means for disconnecting the intercom line circuit means from the loudspeaker and microphone means and switching the loudspeaker and microphone circuit means to the central office line circuit means, said central office line circuit means having previously been switched to a hold condition.

* * * * *